(12) United States Patent
Takumi et al.

(10) Patent No.: US 12,260,206 B2
(45) Date of Patent: Mar. 25, 2025

(54) INFORMATION PROCESSING DEVICE, INFORMATION PROCESSING SYSTEM AND NON-TRANSITORY COMPUTER READABLE MEDIUM

(71) Applicant: KABUSHIKI KAISHA TOSHIBA, Tokyo (JP)

(72) Inventors: Shinya Takumi, Sumida Tokyo (JP); Yurie Shinke, Kawasaki Kanagawa (JP); Ryuiti Koike, Kawasaki Kanagawa (JP); Fumihiko Sano, Kawasaki Kanagawa (JP); Jun Kanai, Inagi Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 87 days.

(21) Appl. No.: 17/823,879

(22) Filed: Aug. 31, 2022

(65) Prior Publication Data

US 2023/0185560 A1 Jun. 15, 2023

(30) Foreign Application Priority Data

Dec. 15, 2021 (JP) ................................. 2021-203627

(51) Int. Cl.
*G06F 8/65* (2018.01)
(52) U.S. Cl.
CPC ....................................... *G06F 8/65* (2013.01)
(58) Field of Classification Search
CPC ........................................................ G06F 8/65
(Continued)

(56) References Cited

U.S. PATENT DOCUMENTS 6,438,749 B1\* 8/2002 Chamberlain ...... G06F 11/1433
714/E11.135
9,081,964 B2 7/2015 Liu et al.
(Continued)

FOREIGN PATENT DOCUMENTS

JP 2001-282544 A 10/2001
JP 2018-14629 A 1/2018

OTHER PUBLICATIONS

Mohan et al., "ARIES: A Transaction Recovery Method Supporting Fine-Granularity Locking and Partial Rollbacks Using Write-Ahead Logging", 1992, ACM, pp. 94-162. (Year: 1992).\*

(Continued)

*Primary Examiner* — Ted T. Vo
(74) *Attorney, Agent, or Firm* — Finnegan, Henderson, Farabow, Garett & Dunner, LLP

(57) ABSTRACT

An information processing system includes an edge server and a low-end device. The edge server has a storage and a processor. The low-end device has a storage and a processor, connected to the edge server. The processor of the low-end device transmits abnormality information for detecting its own abnormality to the edge server, the storage of the edge server stores information on the software. The low-end device information includes the version of the software. The processor of the edge server detects an abnormality in the low-end device based on the abnormality information, acquires version information of the software, acquires information on rollback software which is a version of software older than a version in the version information of the software running in the low-end device from the storage, and requests the low-end device to roll back the software based on the information on the rollback software.

17 Claims, 15 Drawing Sheets

(58) Field of Classification Search
USPC .................................................. 717/168–178
See application file for complete search history.

(56) References Cited

U.S. PATENT DOCUMENTS

| | | | |
|---|---|---|---|
| 10,009,261 B2* | 6/2018 | Zhang | H04L 41/0863 |
| 10,797,952 B1* | 10/2020 | Mills | H04L 41/0859 |
| 2008/0155526 A1* | 6/2008 | Gokhale | G06F 8/62 |
| | | | 717/169 |
| 2008/0178168 A1* | 7/2008 | Sriram | G06F 8/658 |
| | | | 717/169 |
| 2013/0155843 A1* | 6/2013 | Berg | H04W 40/02 |
| | | | 370/221 |
| 2019/0034256 A1* | 1/2019 | Fox | G06F 9/445 |
| 2021/0247996 A1 | 8/2021 | Onai et al. | |
| 2022/0326931 A1* | 10/2022 | Choi | B60W 50/14 |

OTHER PUBLICATIONS

Harmatos et al., "Architecture Integration of 5G Networks and Time-Sensitive Networking with Edge Computing for Smart Manufacturing", 2021, Electronics, 28 pages. (Year: 2021).*
Japan Patent Office, Office Action in JP App. No. 2021-203627, 5 pages, and machine translation, 5 pages (Dec. 20, 2024).

* cited by examiner

```
{
        "protocol":"ping",
        "timeout":10,
        "header":{
                "source address":"192.168.0.1",
                "destination address ":"192.168.0.2",
        },
        "payload":{
                0:0x1,
                1:0x0-0x2
                2-4:0x1
        }
}
```

FIG. 4

```
{
        "start":0x1000,
        "end":0x2000,
        "software format":"binary"
}
```

FIG. 6

INFORMATION PROCESSING DEVICE, INFORMATION PROCESSING SYSTEM AND NON-TRANSITORY COMPUTER READABLE MEDIUM

CROSS REFERENCE TO THE RELATED APPLICATIONS

This application is based upon and claims the benefit of priority from the prior Japanese Patent Application No. 2021-203627, filed on Dec. 15, 2021, the entire contents of which are incorporated herein by reference.

FIELD

Embodiments of the invention relate to an information processing device, an information processing system, and a non-transitory computer readable medium.

BACKGROUND

With the advancement of various information processing systems, software becomes complicated and open source software (OSS) is widely used. Along with these, the risk of vulnerability entering the system is also increasing. Since there is a possibility of being subjected to a so-called zero-day attack that immediately exploits the discovered vulnerability, it is desirable to immediately perform an update for correcting the vulnerability.

On the other hand, when the update is performed, there is also a risk that an abnormality occurs in the system due to a change in behavior of the software. Even if it can be confirmed that no abnormality occurs at the unit test level of the unit and the module, there is a risk that the abnormality occurs in the actual environment depending on a combination of the software, hardware, environment, and the like. Therefore, although there is a request for correcting the vulnerability as soon as possible, there is also a request for updating after performing a sufficient test. As a method for alleviating or solving the dilemma of possibility of occurrence of abnormality due to rapid update and insufficient test, there is a rollback technique to revert the software to the pre-update software when the abnormality occurs.

However, in low-end devices that are various edge devices such as smart meters, the sizes of memories and storages are often limited due to the size of the device, power consumption, use of a special interface depending on the device, or cost. Therefore, in the low-end device, there is a problem that sufficient memory or storage for recording rollback software in the low-end device in order to realize rollback cannot be secured.

BRIEF DESCRIPTION OF THE DRAWINGS

FIG. 4 is a diagram illustrating an example of a response to response confirmation communication according to the embodiment;

FIG. 6 is a diagram illustrating an example of a software change information header according to the embodiment;

DETAILED DESCRIPTION

According to one embodiment, an information processing system includes one or more edge servers and one or more low-end devices. The one or more edge servers each having a storage and a processing circuit. The one or more low-end devices each having a storage and a processing circuit, connected to at least one of the edge servers, and changing software in response to a request from the edge server. The processing circuit of the low-end device transmits abnormality information for detecting its own abnormality to the edge server, the storage of the edge server stores information on the software for every version and low-end device information including the version of the software to run on the low-end device, and the processing circuit of the edge server detects an abnormality in the low-end device based on the abnormality information acquired from the low-end device, acquires version information of the software of the low-end device stored in the storage based on the abnormality detected, acquires information on rollback software, which is a version of software older than a version in the version information of the software running in the low-end device, from the storage, and requests the low-end device to roll back the software based on the information on the rollback software.

Hereinafter, embodiments will be described with reference to the drawings.

First Embodiment

Figure 1:
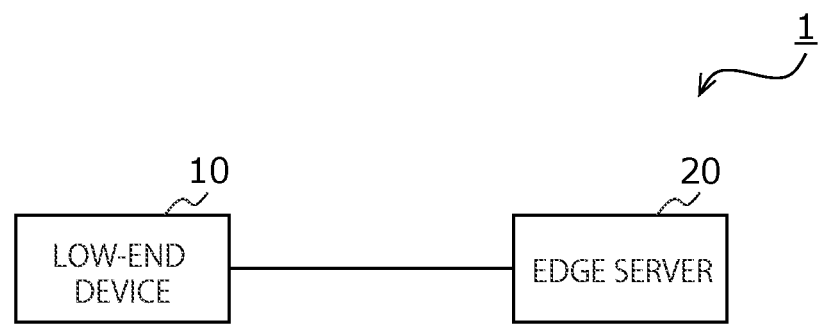
FIG. 1 is a diagram schematically illustrating an information processing system according to an embodiment.

FIG. 1 is a diagram illustrating an outline of an information processing system according to an embodiment. An information processing system 1 includes a low-end device 10 and an edge server 20. Although not illustrated, the low-end device 10 and the edge server 20 include a storage unit such as a storage circuit or a storage, and a processing circuit connected to the storage unit.

Hereinafter, an operation of the processing circuit will be mainly described, but this circuit may be implemented as an analog circuit or a digital circuit as hardware, or may be implemented such that information processing by software can be specifically performed using a hardware resource called a processing circuit. In the case of operating with software, a program, an executable file, and the like for performing information processing of the software may be stored in each storage unit.

The information processing system 1 is a system that performs an update of software including firmware or middleware in the low-end device 10 including an edge device by using the edge server 20. The information processing system 1 includes one low-end device 10 and one edge server 20 in FIG. 1, but is not limited thereto, and may include a plurality of low-end devices 10 and/or a plurality of edge servers 20.

In the information processing system 1, the low-end device 10 and the edge server 20 are connected in a state communicable with each other in a wired or wireless manner. For the connection, a network such as Ethernet (registered trademark) may be used, or a bus such as controller area network (CAN) or Modbus (registered trademark) may be used. The connection between the low-end device 10 and the edge server 20 may be via a router or a hub, a network device such as a switch, a switching hub, or the like.

The low-end device 10 and the edge server 20 include, for example, a processing circuit such as a CPU and a storage unit such as a memory and a storage connected to the processing circuit. Each of components described below may be a part of the operation of the processing circuit or the storage unit.

Figure 2:
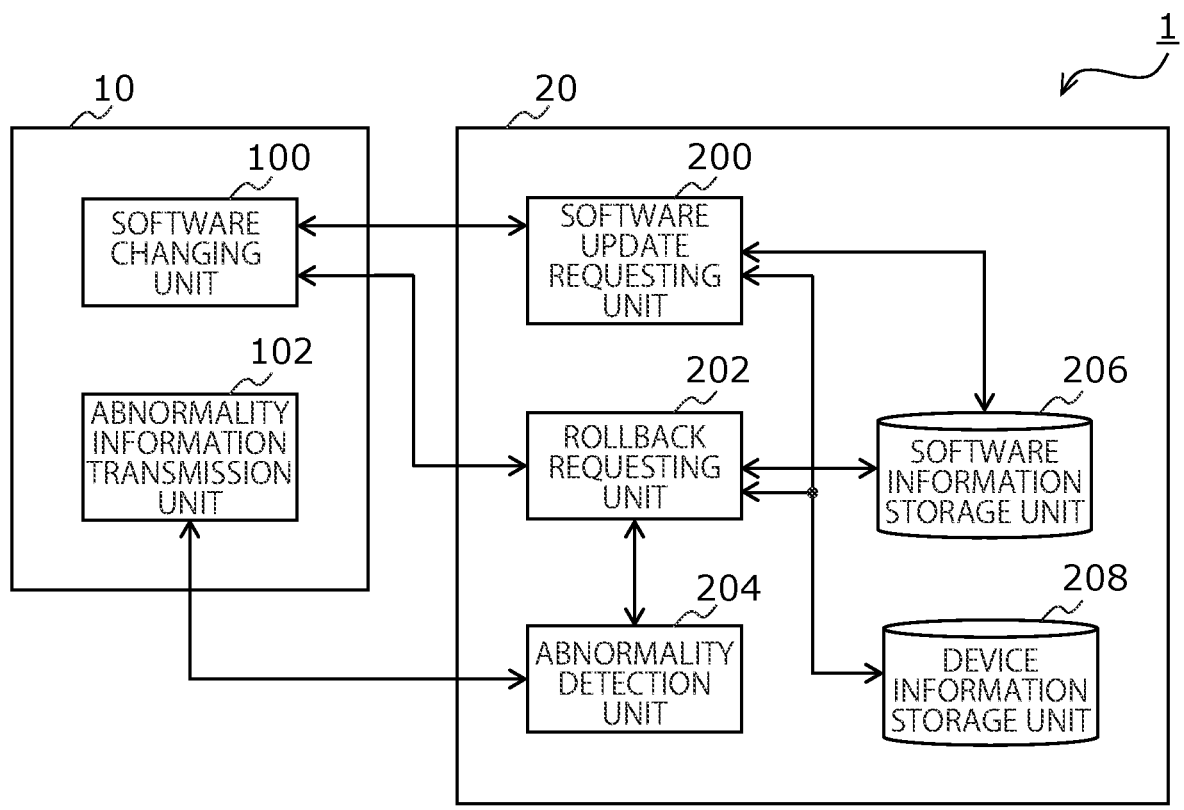
FIG. 2 is a diagram schematically illustrating the information processing system according to the embodiment.

FIG. 2 is a block diagram illustrating an example of a configuration of the low-end device 10 and the edge server 20 as the information processing system 1 according to the present embodiment. The low-end device 10 includes a software changing unit 100 and an abnormality information transmission unit 102. The edge server 20 includes a software update requesting unit 200, a rollback requesting unit 202, an abnormality detection unit 204, a software information storage unit 206, and a device information storage unit 208.

The software changing unit 100 changes software of the low-end device 10 based on a request from the edge server 20. Software change includes processing of updating to new software and rolling back to old software. The software changing unit 100 acquires information on the software to be changed from the edge server 20 and updates the software based on the information. The information on the software may include the program, the executable file, or a batch file required for changing the software together with information on the type of the software and information on the version of the software.

When an abnormality occurs in the low-end device 10, the abnormality information transmission unit 102 transmits information for detecting the abnormality on the edge server 20 side to the edge server 20. As a non-limiting example, the abnormality information transmission unit 102 may transmit abnormality information to the edge server 20 every predetermined period such as 10 seconds. The predetermined period can be changed to various values by the configuration of the information processing system 1. In addition, this period may not be a predetermined interval, and the interval may change with the lapse of time. For example, when the software is updated or the software is rolled back, a notification period may be shortened for a while immediately after this, and if a stable state continues thereafter, the notification period may be lengthened.

Upon acquiring update information on the software operating in the low-end device 10, the software update requesting unit 200 transmits a software update request to the low-end device 10 based on the information. The software update requesting unit 200 may transmit an updater or the like required for the update together with the software update request. For example, the software update requesting unit 200 may acquire the update information from various memories and storages as described later, or may acquire the update information from another device via a network. As another example, the user may explicitly notify the software update requesting unit 200 of the update information, or the software update requesting unit 200 may access the software information storage unit 206 to acquire the update information.

When it is determined that rollback of the software is required in the low-end device 10, the rollback requesting unit 202 transmits a rollback request of the software to the software changing unit 100. Similarly to the software update requesting unit 200, the rollback requesting unit 202 may transmit rollback data or the like required for the rollback together with the rollback request.

The abnormality detection unit 204 detects the abnormality in the low-end device 10 based on the abnormality information transmitted from the abnormality information transmission unit 102. Upon detecting the abnormality in the low-end device 10 based on the abnormality information, the abnormality detection unit 204 notifies the rollback requesting unit 202 that the abnormality has occurred. In the above description, the abnormality information transmission unit 102 notifies the abnormality information every predetermined period, but the present disclosure is not limited thereto, and the abnormality detection unit 204 may request the abnormality information transmission unit 102 to notify the abnormality information, and the abnormality information transmission unit 102 may notify the abnormality information in response to the request from the abnormality detection unit 204.

The software information storage unit 206 is provided as a part of the storage unit, and stores the information on the software for each version. The software information storage unit 206 may directly store an image file or the like corresponding to the version, or may store information for accessing the image file or the like. Further, in place of the image file itself, difference information between the versions may be stored in the software information storage unit 206. Furthermore, in particular, information indicating a stable version may also be stored in the software information storage unit 206.

The device information storage unit 208 stores low-end device information including a version of software operating in the low-end device 10. For example, in a case where the plurality of low-end devices 10 are connected to the edge server 20, the device information storage unit 208 stores information of software operating in each low-end device 10 and a version of the software.

When there is the plurality of edge servers 20, the software information storage unit 206 and the device information storage unit 208 may be managed in synchronization. As another example, a storage, a file server, or the like that can be commonly accessed may be provided for the plurality of edge servers 20, and the corresponding edge server 20 may be in a state of being connectable to the storage or the like. That is, in FIG. 2 (the same applies to the block diagram used in the following description), the storage unit is provided in the edge server 20, but the present disclosure is not limited thereto, and the storage unit may be outside the edge server 20. The same applies to the storage unit of the low-end device 10.

Figure 3:
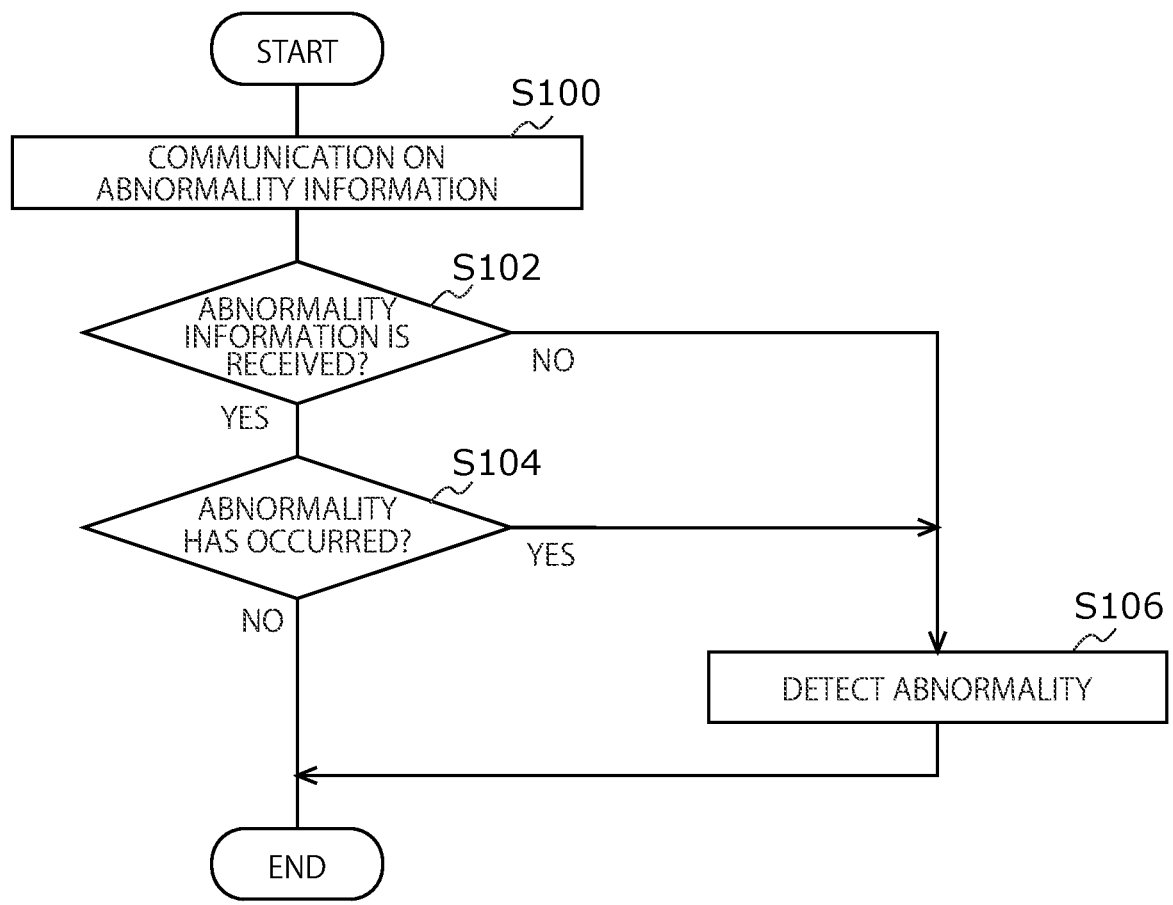
FIG. 3 is a flowchart illustrating abnormality detection processing of the information processing system according to the embodiment.

FIG. 3 is a flowchart illustrating a non-limiting example of abnormality detection processing of the information processing system 1 according to the present embodiment. The flowchart illustrates, for example, processing on an operation of the abnormality detection unit 204 of the edge server 20.

First, the abnormality detection unit 204 performs communication on abnormality information with the abnormality information transmission unit 102 (S100). As a non-limiting example, the abnormality detection unit 204 may transmit response confirmation communication to the abnormality information transmission unit 102, and the abnormality information transmission unit 102 may transmit the abnormality information to the abnormality detection unit 204 in response to the response confirmation communication. As another non-limiting example, the abnormality information transmission unit 102 may transmit the abnormality information to the abnormality detection unit 204 at an invariable or variable cycle.

The abnormality detection unit 204 may perform the response confirmation communication, for example, by transmitting a ping to the abnormality information transmission unit 102. There is no limitation on a communication protocol, and as another example, the response confirmation communication may be performed via communication using a generally used protocol such as HTTP, HTTPS, or Mod bus/TCP, or a unique protocol.

FIG. 4 is a diagram illustrating an example of a response to the response confirmation communication, that is, the abnormality information transmitted from the abnormality information transmission unit 102. In this example, description is made using JavaScript Object Notation (JSON) as an example of the content of the abnormality information, but the format and description method are not limited thereto, and any format may be used as long as necessary content can be appropriately described. Further, as another example, a response confirmation to the response confirmation communication may be implemented in the abnormality detection unit 204 without creating a file. Furthermore, the names such as "protocol" and "header" are not limited thereto, and the item name may be arbitrary, or the item name may not be defined. As an example, since the communication is performed by ping, "protocol" is set to "ping".

"source address" in "header" indicates, for example, a transmission source IP address, and "destination address" indicates a transmission destination IP address. The "header" may include other header information, for example, header information depending on the protocol such as TCP/IP header information, or frame header information such as a media access control (MAC) address.

0:0x1 in "payload" indicates that a zeroth byte of the payload is 0x1, 1:0x0-0x2 indicates that a first byte of the payload is in a range of 0x0 to 0x2, and 2-4:0x1 indicates that second to fourth bytes of the payload are 0x1.

Returning to FIG. 3, if the abnormality information is received (S102: YES), the abnormality detection unit 204 determines whether the abnormality has occurred in the low-end device 10 based on the received abnormality information (S104). The abnormality detection unit 204 determines whether the abnormality has occurred by checking the contents of the header or the payload of the abnormality information and checking whether the abnormality information has the expected contents.

When no abnormality has occurred (S104: NO), the abnormality detection unit 204 enters a standby state and continuously performs the processing from S100.

When the abnormality information is not received within a predetermined period (S102: NO), or when it is determined from the received abnormality information that the abnormality has occurred (S104: YES), the abnormality detection unit 204 detects the abnormality (S106). A determination that the abnormality has occurred is performed as follows as a non-limiting example.

In the example of FIG. 4, "timeout" indicates the predetermined period for receiving the abnormality information, and indicates a state of waiting for the response for 10 seconds. When the abnormality information that is the response is not received from the low-end device 10 within 10 seconds, the abnormality detection unit 204 determines that the abnormality has occurred (S102: NO).

The abnormality detection unit 204 refers to "header" and checks whether the contents of the header of the abnormality information is correct. For example, in the abnormality information in FIG. 4, when the transmission source IP address is different from 192.168.0.1 or the transmission destination IP address is different from 192.168.0.2, the abnormality detection unit 204 determines that the abnormality has occurred (S104: YES). Further, if the contents of the payload do not match the contents of "payload" described above, the abnormality detection unit 204 determines that the abnormality has occurred (S104: YES).

Upon detecting the abnormality (S106), the abnormality detection unit 204 notifies the rollback requesting unit 202 of the abnormality. For example, a signal may be used for notification of the abnormality, and as another example, any method may be used as long as the method can notify the rollback requesting unit 202 of abnormality content, such as rewriting a value of a pipe, a message queue, a socket, or a memory shared with the rollback requesting unit 202.

The abnormality detection unit 204 may record the detected abnormality in a file or a database. In recording of the abnormality, the abnormality may be transmitted to the outside via a communication protocol such as HTTP, HTTPS, SMTP, or SNMP. As another example, the abnormality detection unit 204 may output the abnormality using various interfaces, for example, display the abnormality on an external display device such as a display.

Upon receiving the notification from the abnormality detection unit 204, the rollback requesting unit 202 performs rollback of the software of the low-end device 10.

Figure 5:
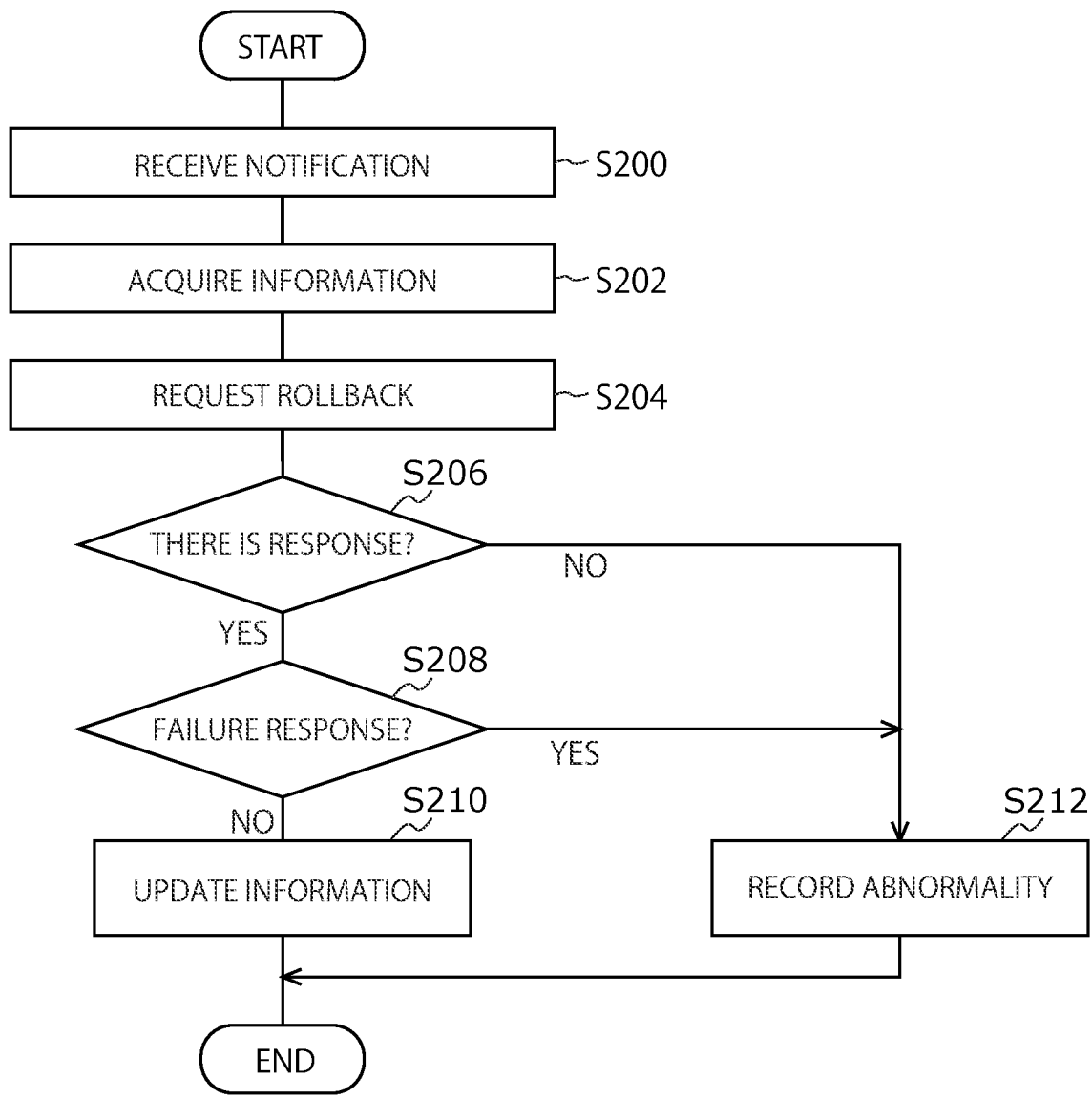
FIG. 5 is a flowchart illustrating an example of processing of a rollback request according to the embodiment.

FIG. 5 is a flowchart illustrating an example of a rollback processing.

The rollback requesting unit 202 starts the processing upon receiving the notification that the abnormality has occurred from the abnormality detection unit 204 (S200).

The rollback requesting unit 202 acquires information on the low-end device 10 in which the abnormality has occurred from the device information storage unit 208, and acquires the software and a software change information header from the software information storage unit 206 (S202).

The information on the low-end device stored in the device information storage unit 208 includes the software operating in the low-end device 10 and version information of the software. The information on the low-end device may further include, for example, information on hardware such as a CPU type, a memory capacity, a storage capacity, and a memory map, and information such as a device name and an operating system (OS) used.

The software information storage unit 206 stores the software and the software change information header in association with a software version described in semantic versioning. The format of the software version is not particularly limited as long as the version can be recognized. The software stored in the software information storage unit 206 may be compressed, encrypted, or variously encoded. In addition, the stored software may be given a signature, or a difference for each version may be recorded as the software.

FIG. 6 is a diagram illustrating a non-limiting example of the software change information header. The software change information header is described using, for example, JSON, but this format is not limited. Furthermore, the software change information header may have items other than "start" and "end" illustrated in the figure.

The "start" indicates a start memory address of the software in the low-end device 10 in which the software will be changed. The "end" indicates an end memory address of the software in the low-end device 10 in which the software will be changed.

"binary" of "software format" indicates, for example, that the software associated with the software change information can be executed in the processing circuit of the low-end device 10 by being deployed in the memory of the low-end device 10 in a state of a file as it is.

The rollback requesting unit 202 extracts the version information of the software from the information on the low-end device 10 read from the device information storage unit 208. The rollback requesting unit 202 acquires, from the software information storage unit 206, information on the rollback software that is software information associated with a version older than the extracted version by one or earlier. The software to be acquired may be, for example, the stable version.

Returning to FIG. 5, after acquiring various types of information, the rollback requesting unit 202 transmits the rollback request to the low-end device 10 (S204). The software acquired in S202 and the software change information header are transmitted to the software changing unit 100. The rollback requesting unit 202 may transmit a plurality of software change information headers and the corresponding plurality of pieces of software to the low-end device 10.

The software changing unit 100 that has received the software change information header deploys (maps) the software from 0x1000 to 0x2000 of the memory of the low-end device 10 based on the received software change information header.

The rollback requesting unit 202 may transmit encrypted software such as AES or RSA to the software changing unit 100. Information on encryption may be added to the software change information header so that the software changing unit 100 can decrypt the encrypted software. The software changing unit 100 may have a function of decrypting the software based on the information on encryption added to the software change information header, or the low-end device 10 may separately include a decryptor.

The rollback requesting unit 202 may transmit encoded software such as base64 to the software changing unit 100. Information on decoding may be added to the software change information header so that the software changing unit 100 can decode the encoded software. The software changing unit 100 may have a function of decoding the software based on the information on decoding added to the software change information header, or the low-end device 10 may separately include a decoder.

The rollback requesting unit 202 may transmit compressed software such as zip, 7z, rar, tar, or lha to the software changing unit 100. Information on decompression may be added to the software change information header so that the software changing unit 100 can decompress the compressed software. The software changing unit 100 may have a function of decompressing the software based on the information on decompression added to the software change information header, or the low-end device 10 may separately include a decompression unit.

In this way, the software change information header may include various format information on the software. In addition, the software changing unit 100 may be configured to be able to convert update software information into software executable on the low-end device 10 based on the format information of the software.

The rollback requesting unit 202 may transmit software, that can be granted a certificate such as x.509 and authenticated, to the software changing unit 100. Information on the certificate may be added to the software change information header so that the software changing unit 100 can verify whether the software can be authenticated based on the certificate. The software changing unit 100 may have a function of verifying the software based on the information on the certificate added to the software change information header, or the low-end device 10 may separately include an authentication unit.

The rollback requesting unit 202 may transmit the software change information header, to which the signature is added, to the software changing unit 100. The software changing unit 100 may have a function of verifying the signature of the software change information header based on the signature added to the software change information header, or the low-end device 10 may separately include a signature verification unit.

When the software change is normally completed, the software changing unit 100 transmits a software change completion response to the rollback requesting unit 202. When the software change fails, the software changing unit 100 transmits a software change failure response to the rollback requesting unit 202 The software change failure response may include information in which a factor of failure is recorded. Note that the software changing unit 100 may transmit the above information to the software update requesting unit 200, and in this case, the software update requesting unit 200 may transmit these pieces of information to the rollback requesting unit 202.

The rollback requesting unit 202 waits for the software change completion response or the software change failure response from the software changing unit 100 for a predetermined time after making the rollback request, and determines whether there is a response (S206). For example, the predetermined time may be 10 seconds, or is not limited thereto as described above, and may be an invariable or variable time.

If the response from the software changing unit 100 is received (S206: YES), the rollback requesting unit 202 determines whether the response from the software changing unit 100 is the software change completion response or the software change failure response (S208).

If the response from the software changing unit 100 is received (S208: NO), the rollback requesting unit 202 determines that the software change has been normally performed in the software changing unit 100. The rollback requesting unit 202 changes the operating software version of the low-end device information to the software version transmitted to the software changing unit 100, and updates the information in the device information storage unit 208 (S210). In addition, the rollback requesting unit 202 may update the information in the device information storage unit 208 by changing the low-end device information other than the software version.

On the other hand, if the response from the software changing unit 100 is not received for a predetermined time (S206: NO) or if the software change failure response is received (S208: YES), the rollback requesting unit 202 determines that the software change has failed. Upon detecting the failure of the software change by the software changing unit 100, the rollback requesting unit 202 may record the failure in a file or a database (S212). A failure record may be transmitted to the outside via the communication protocol such as HTTP, HTTPS, SMTP, or SNMP, and on a receiving side, information on the failure may be displayed on the external display device such as a display or output to an external output device. In addition, the factor of the failure of the software change may be recorded as a log.

Figure 7:
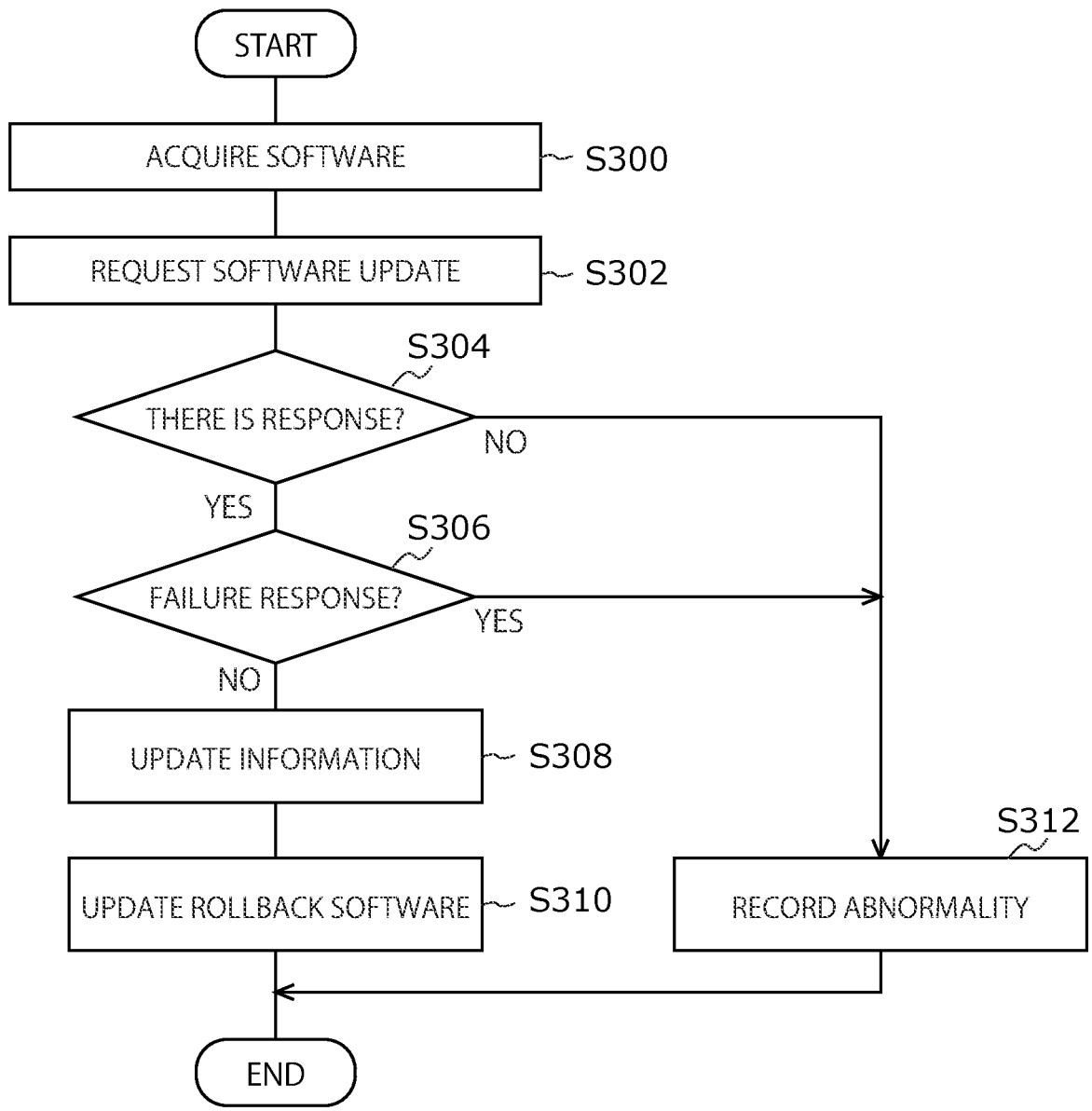
FIG. 7 is a flowchart illustrating an example of processing of a software update request according to the embodiment.

FIG. 7 is a flowchart illustrating a non-limiting example of processing of the software update requesting unit 200.

The software update requesting unit 200 acquires the software version, update software, and the software change information header, for example, via a medium such as a USB memory or an SD card, or via JTAG, a network, or the like (S300).

The software update requesting unit 200 transmits the acquired software and the software change information header to the software changing unit 100, and transmits a software rollback request to the low-end device 10 (S302).

Since S304, S306, S308, and S312 are respectively the same processing as S206, S208, S210, and S212 in FIG. 5, detailed descriptions thereof will be omitted. It should be noted that subject of the operation is the software update requesting unit 200.

The software update requesting unit 200 stores and updates the software version, the update software, and the software change information header acquired in S300 in the software information storage unit 206 (S310). Through this processing, information such as the software and the software version to be a future rollback destination is updated.

As described above, according to the present embodiment, the low-end device 10 can perform appropriate software rollback based on the request from the edge server 20.

(Modification)

Figure 8:
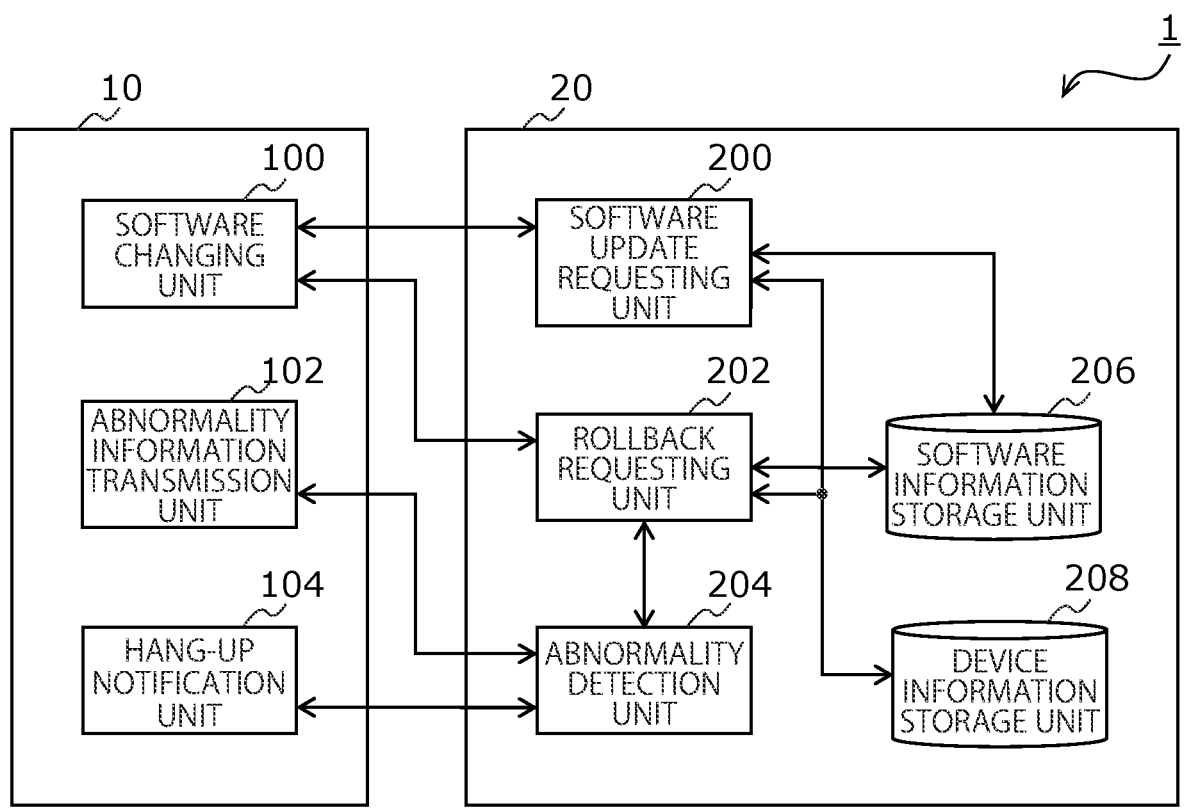
FIG. 8 is a diagram schematically illustrating the information processing system according to the embodiment.

FIG. 8 is a block diagram schematically illustrating the information processing system 1 according to a modification of the first embodiment. The low-end device 10 further includes a hang-up notification unit 104 in addition to components of the first embodiment.

When there is no periodic access from the low-end device 10, the hang-up notification unit 104 determines that the software (including the OS) in the low-end device 10 hangs up, and notifies the edge server 20 that the low-end device 10 hangs up.

The hang-up notification unit 104 may detect the abnormality, for example, using a configuration of Watchdog or the like for detecting the abnormality. Further, the hang-up notification unit 104 may add at least part of memory data read from the memory of the low-end device 10, or information such as a core dump to abnormality notification and transmit the abnormality notification.

As described above, according to the present modification, when the low-end device 10 hangs up, it is further possible to quickly perform rollback.

Second Embodiment

Figure 9:
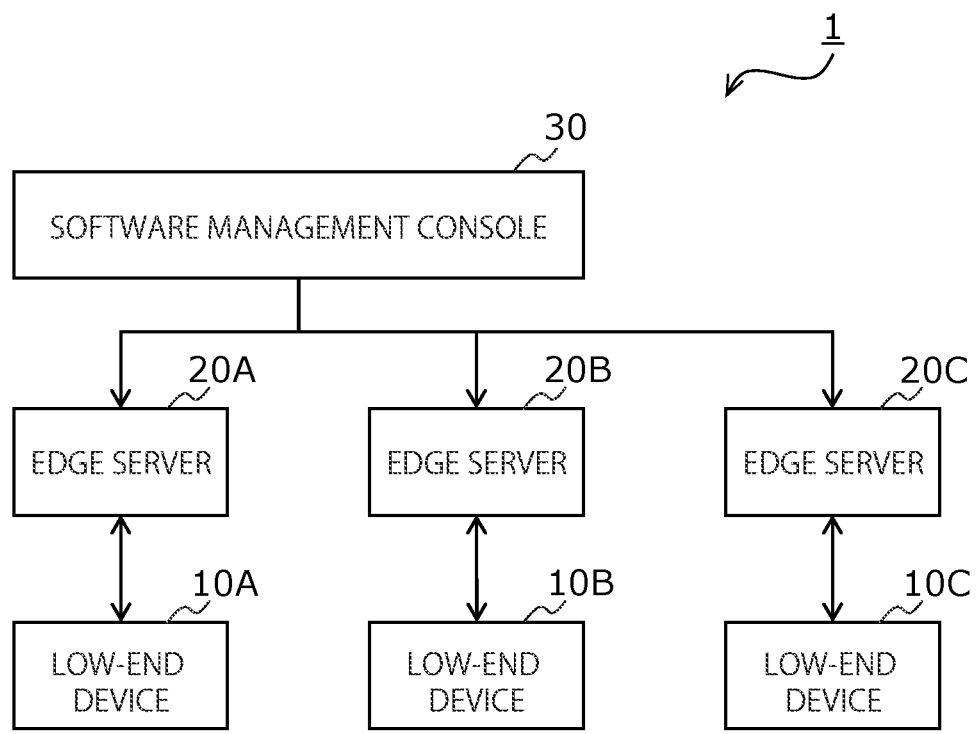
FIG. 9 is a diagram schematically illustrating the information processing system according to the embodiment.

FIG. 9 is a block diagram schematically illustrating the information processing system 1 according to a second embodiment. In the first embodiment described above, the information processing system 1 is constituted by the low-end device 10 and the edge server 20, but in the present embodiment, the information processing system 1 further includes a software management console 30.

A low-end device 10A is connected to an edge server 20A, a low-end device 1013 is connected to an edge server 20B, and a low-end device 10C is connected to an edge server 20C. More low-end devices 10 and edge servers 20 may be provided. As a non-limiting example, the low-end device 10A and the low-end device 1013 may be connected in a communicable manner. Further, the edge server 20A and the edge server 20B may be connected in a communicable manner. Furthermore, the edge server 20B and the low-end device 10C may be connected. In this manner, the low-end device 10 and the edge server 20 may be connected in an arbitrary mutually communicable manner.

The software management console 30 includes, for example, the processing circuit such as the CPU and the storage unit such as the memory and the storage connected to the processing circuit. Each of components described below may be a part of the operation of the processing circuit or the storage unit. The software management console 30 is connected to the edge servers 20A, 20B, and 20C by arbitrary means. In addition, although only one software management console 30 is illustrated in FIG. 9, a plurality of software management consoles 30 may be provided.

Figure 10:
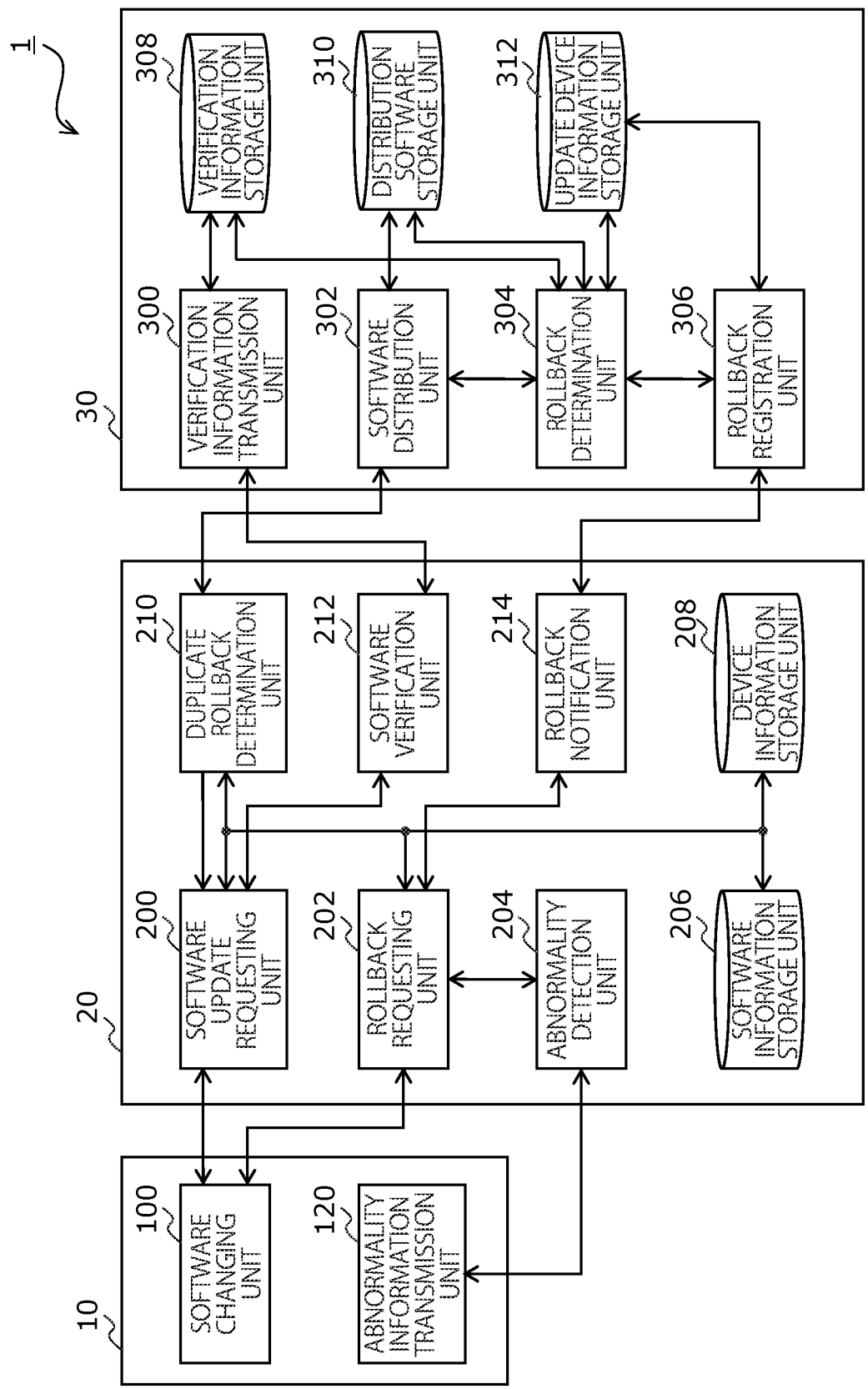
FIG. 10 is a diagram schematically illustrating the information processing system according to the embodiment.

FIG. 10 is a block diagram illustrating a non-limiting example of a configuration of the low-end device 10, the edge server 20, and the software management console 30. Note that only one low-end device 10, one edge server 20, and one software management console 30 are illustrated in this figure, but as described above, a plurality of each may be provided depending on the configuration.

The software management console 30 includes a verification information transmission unit 300, a software distribution unit 302, a rollback determination unit 304, a rollback registration unit 306, a verification information storage unit 308, a distribution software storage unit 310, and an update device information storage unit 312.

The verification information transmission unit 300 transmits meta information for verifying software to a software verification unit 212.

The software distribution unit 302 distributes the software to a duplicate rollback determination unit 210.

The rollback determination unit 304 simultaneously instructs the rollback to an edge server group including the plurality of edge servers 20 via the software distribution unit 302.

The rollback registration unit 306 registers information of a low-end device group including the plurality of low-end devices 10 that have been rolled back, the information having been notified from a rollback notification unit 214 of the edge server group.

The verification information storage unit 308 stores the meta information for verifying the software.

The distribution software storage unit 310 stores distribution software for each version.

The update device information storage unit 312 stores information of the rolled back low-end device group.

The edge server 20 includes the duplicate rollback determination unit 210, the software verification unit 212, and the rollback notification unit 214 in addition to components of the above-described embodiment.

The duplicate rollback determination unit 210 skips software update of the low-end device 10 that has been rolled back.

The software verification unit 212 checks correctness of the update software.

The rollback notification unit 214 notifies the rollback registration unit 306 of the rollback of the low-end device 10.

The software distribution unit 302 acquires, for example, the latest version of software for the low-end device 10 from the distribution software storage unit 310 in which the software is stored for each version. The software distribution unit 302 distributes the software to the duplicate rollback determination unit 210 of each edge server 20. The duplicate rollback determination unit 210 receives the software transmitted from the software distribution unit 302.

The software distribution unit 302 may start software distribution to the edge server 20, for example, when the software management console 30 receives the request from the edge server 20 or a request from the outside via software such as a web browser, or when the latest version of software is stored in the distribution software storage unit 310.

When the software management console 30 receives software update completion notification or software update failure notification from the edge server 20, the software distribution unit 302 may store the notification in a file, output the notification to the external device such as a display, or transmit the notification to the outside via the protocol such as HTTP, HTTPS, or SMTP.

Figure 11:
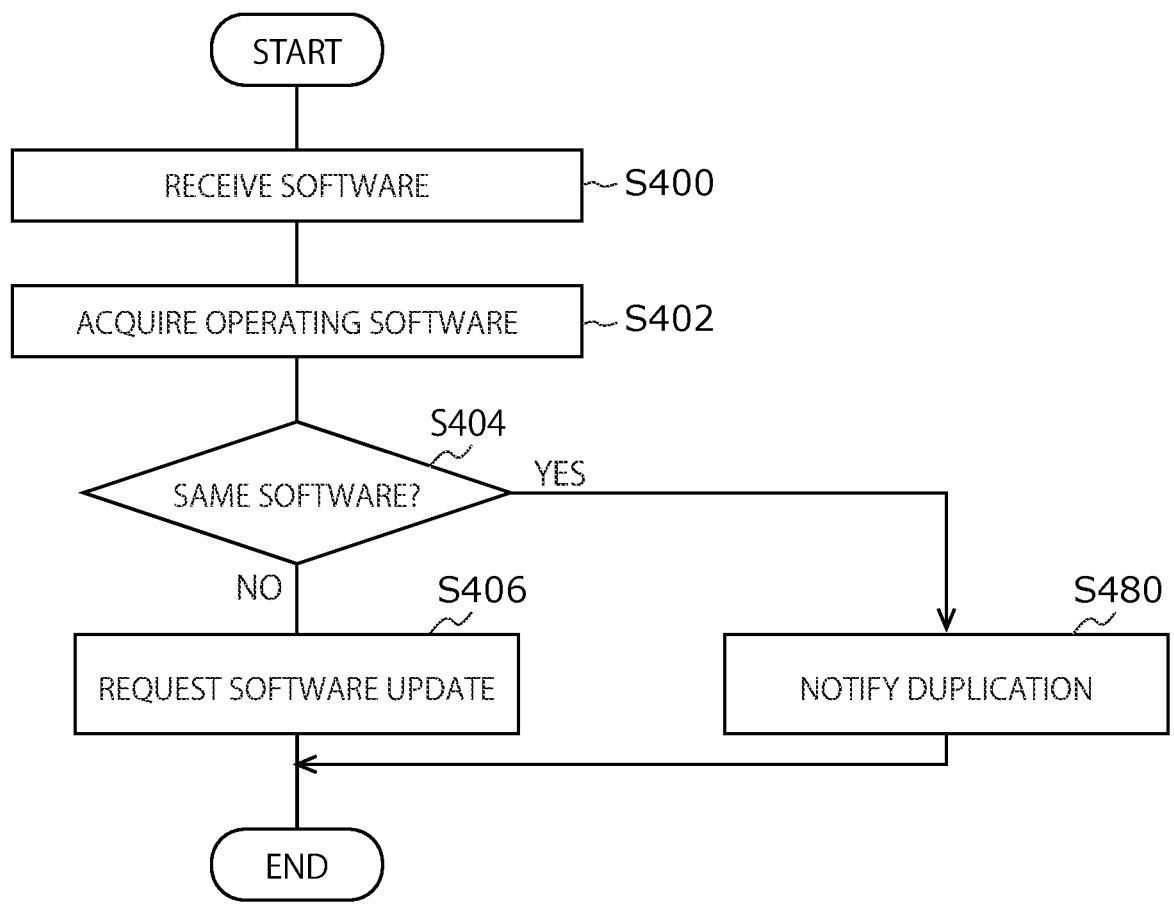
FIG. 11 is a flowchart illustrating an example of processing of a duplicate rollback determination unit according to the embodiment.

FIG. 11 is a flowchart illustrating a non-limiting example of processing of the duplicate rollback determination unit 210.

The duplicate rollback determination unit 210 receives the latest version of software from the software distribution unit 302 (S400).

The duplicate rollback determination unit 210 acquires software version information operating in the low-end device 10 from the low-end device information stored in the device information storage unit 208, and acquires the software operating in the low-end device 10 stored in the software information storage unit 206 based on the acquired software version information (S402).

The duplicate rollback determination unit 210 compares the software acquired in S400 with the software acquired in S402, and determines whether the software is the same (S404). This comparison may also be performed using a digest generated using a hash function based on sha2, sha3, or the like for each software.

If the software is different (S404: NO), the software update requesting unit 200 requests the software changing unit 100 to update the software using the software acquired from the software distribution unit 302 by the duplicate rollback determination unit 210 (S406).

If the software is the same (S404: YES), the duplicate rollback determination unit 210 may store the fact that the software is the same in a file, or may notify the software management console 30 (software distribution unit 302) or another outside (S408). In this case, the software update requesting unit 200 skips updating the software.

Figure 12:
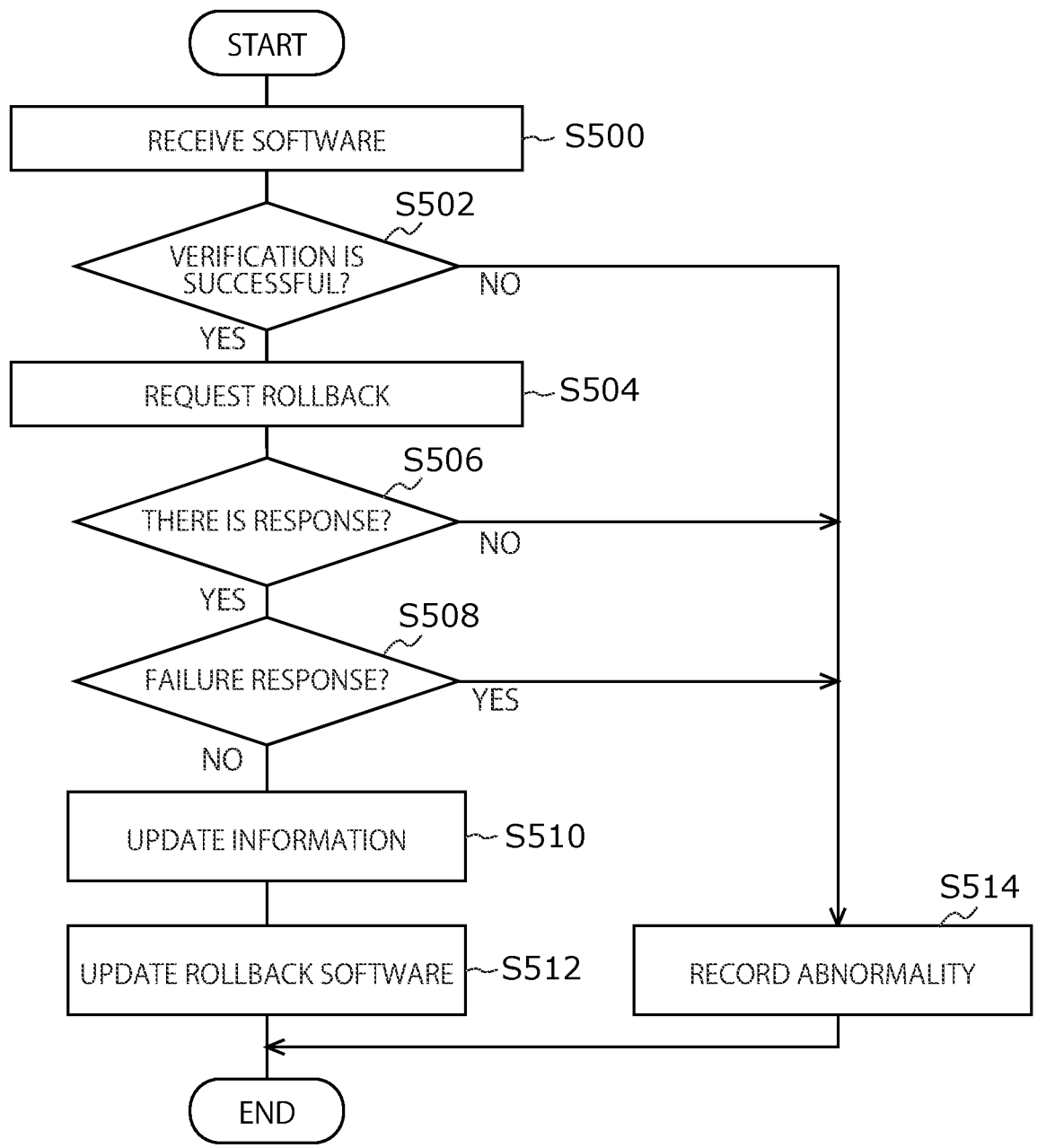
FIG. 12 is a flowchart illustrating an example of processing of a software update requesting unit according to the embodiment.

FIG. 12 is a flowchart illustrating a non-limiting example of the processing of the software update requesting unit 200 according to the present embodiment.

The software update requesting unit 200 receives the software distributed by the duplicate rollback determination unit 210 (S500).

Subsequently, the software verification unit 212 acquires the software from the software update requesting unit 200 and verifies the software (S502). The software verification unit 212 may acquire the software from the duplicate rollback determination unit 210.

If the software verification is successful (S502: YES), the software update requesting unit 200 notifies the software changing unit 100 of the software update request (S504). The subsequent processing is similar to that in the foregoing embodiment. That is, S506, S508, S510, and S512 are respectively the same processing as S304, S306, S308, and S310 in FIG. 7.

On the other hand, if the software verification fails (S502: NO), the rollback requesting unit 202 may record the failure in the file or the database (S514). Processing of S514 is, for example, similar to processing of S212 of FIG. 5.

Figure 13:
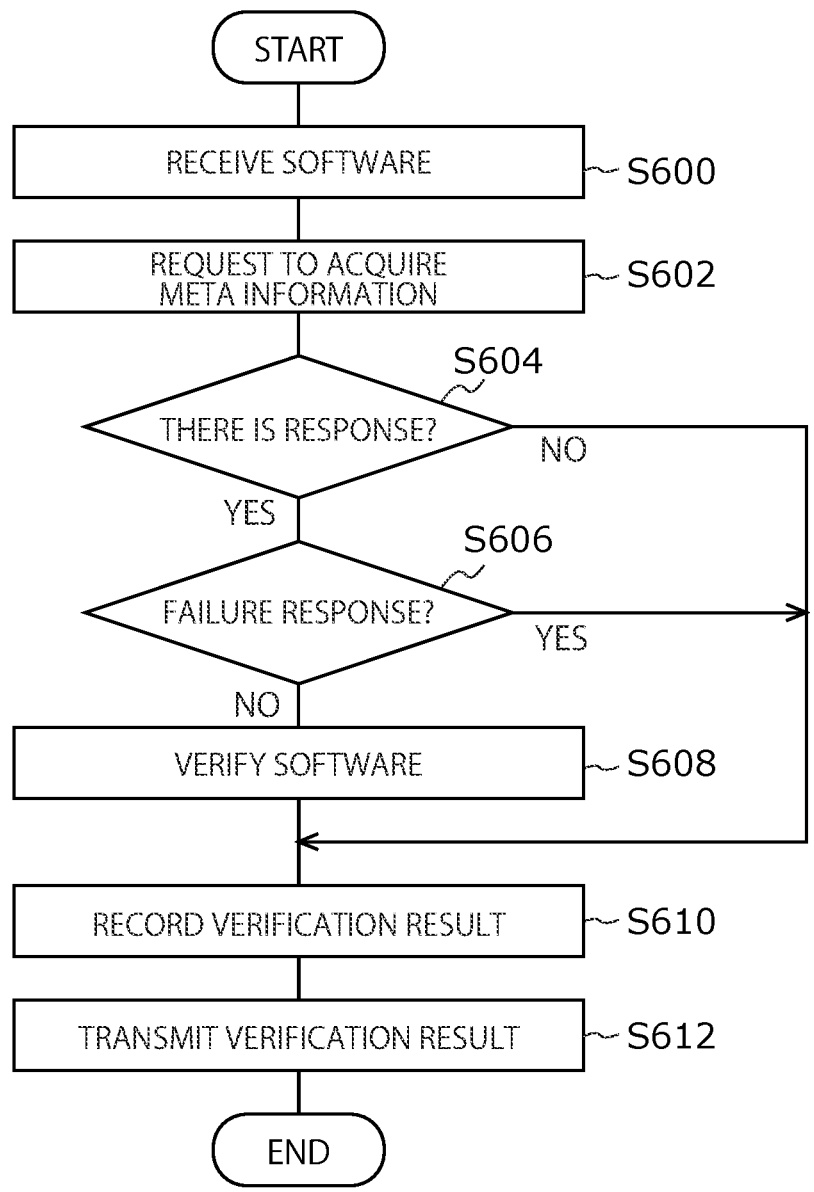
FIG. 13 is a flowchart illustrating an example of processing of a software verification unit according to the embodiment.

FIG. 13 is a flowchart illustrating a non-limiting example of processing of the software verification unit 212 according to the present embodiment.

The software verification unit 212 acquires the software from the software update requesting unit 200 (S600). As described above, the software verification unit 212 may directly acquire the software from the duplicate rollback determination unit 210.

The software verification unit 212 requests the verification information transmission unit 300 to transmit the meta information that is software verification information (S602). The software verification unit 212 may transmit information such as a software name, a device name of the low-end device 10, or an identification number of the low-end device 10 together with the request. In this case, in the following processing, the verification information transmission unit 300 may acquire, from the verification information storage unit 308, information for identifying the software based on the information given to this request, and transmit the information to the software verification unit 212.

The software verification unit 212 waits for reception of the software verification information from the verification information transmission unit 300 (S604), and determines that the software verification has failed if there is no response for a predetermined time, as a non-limiting example, 10 seconds (S604: NO), and performs processing of S610.

If there is a response (S604: YES), the verification information transmission unit 300 may attempt to acquire the software verification information based on the request from the software verification unit 212, and transmit to the software verification unit 212 whether or not the software verification information could have been acquired. The software verification unit 212 receives this notification from the verification information transmission unit 300 and determines whether the verification information could have been normally acquired (S606).

When the received notification is a notification indicating that acquisition of the software verification information has failed, the software verification unit 212 determines that the software verification has failed (S606: YES) and performs the processing of S610.

If the response is not a failure response (S606: NO), the software verification unit 212 verifies the software based on, for example, the software verification information in x.509 format received from the verification information transmission unit 300 (S608). The software verification information may be in a format other than the x.509 format, and may be in any format as long as it is information for appropriately verifying validity or integrity of the software.

The software verification unit 212 may store a verification result, or acquisition success or acquisition failure of the software verification information in a file (S610). The verification result or the like may be notified to the software management console 30 (verification information transmission unit 300) or another outside via the protocol such as HTTP, HTTPS, or SMTP. In addition, the verification result or the like may be output to the external device such as the display. The processing of S610 may be performed only when the verification succeeds or only when the verification fails.

The software verification unit 212 transmits the verification result to the software update requesting unit 200 (S612).

The verification information transmission unit 300 may acquire the software verification information of the latest software from the verification information storage unit 308 according to the request from the software verification unit 212. The verification information transmission unit 300 may transmit the acquired software verification information to the software verification unit 212. The verification information storage unit 308 may store the software verification information in association with the software name, the device name of the low-end device 10, the identification number of the low-end device 10, or the like. The verification information transmission unit 300 may acquire the software verification information according to the request from the software verification unit 212 based on the software name, the device name of the low-end device 10, the identification number of the low-end device 10, or the like.

Figure 14:
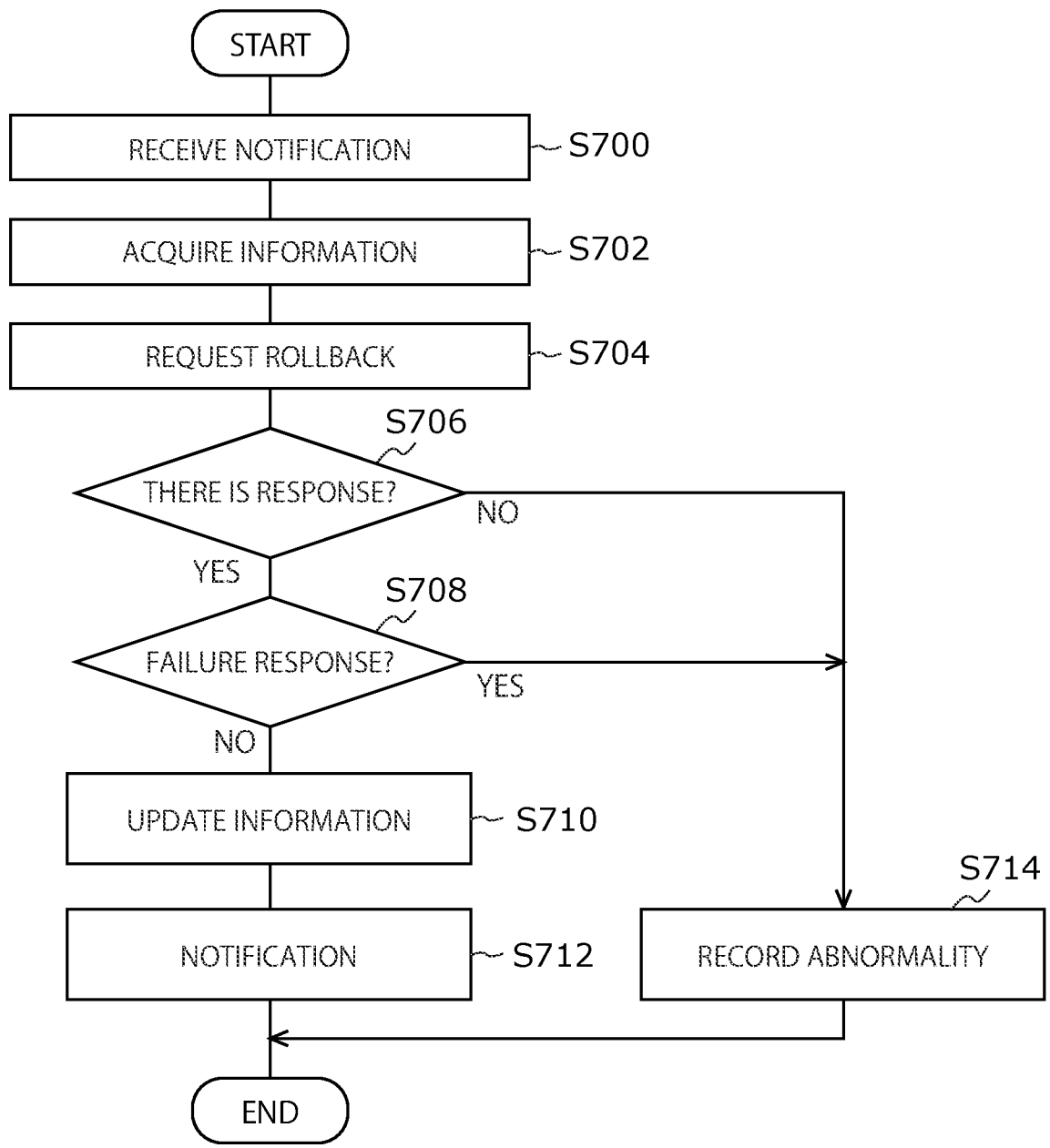
FIG. 14 is a flowchart illustrating an example of processing of a rollback requesting unit according to the embodiment.

FIG. 14 is a flowchart illustrating a non-limiting example of processing of the rollback requesting unit 202 in the present embodiment.

S700 to S710 and S714 are respectively the same processing as S200 to S212 in FIG. 5.

The rollback requesting unit 202 changes the operating software version of the low-end device information to the software version transmitted to the software changing unit 100, and updates the information in the device information storage unit 208 (S710), and then the following processing is performed.

The rollback requesting unit 202 notifies the rollback notification unit 214 of the rolled back software version and the identification number of the rolled back low-end device 10 (S712). The identification number of the low-end device 10 may be the name of the low-end device 10, and the content and format thereof are not limited as long as the low-end device 10 can be identified.

The rollback notification unit 214 transmits the software version and the identification number of the rolled back low-end device 10 to the rollback registration unit 306. The rollback notification unit 214 may transmit information such as the abnormality content recorded in the file by the abnormality detection unit 204, the type of the low-end device 10, or a service name of the low-end device 10 to the rollback registration unit 306 together.

The rollback registration unit 306 stores, in the update device information storage unit 312, the software version transmitted from the rollback notification unit 214 and information on the low-end device 10 such as the identification number of the rolled back low-end device 10. Further, the rollback registration unit 306 notifies the rollback determination unit 304 of occurrence of rollback.

Figure 15:
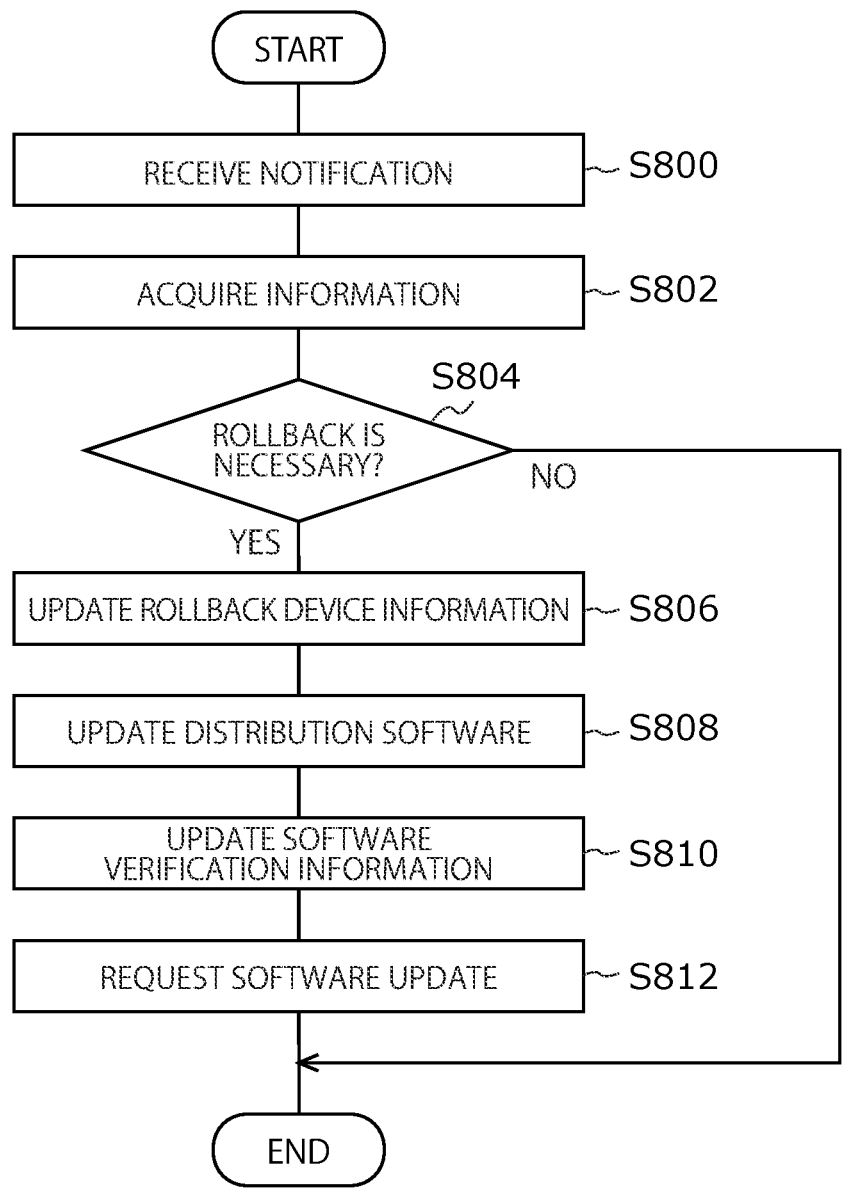
FIG. 15 is a flowchart illustrating an example of processing of a rollback determination unit according to the embodiment.

FIG. 15 is a flowchart illustrating a non-limiting example of processing of the rollback determination unit 304 according to the present embodiment.

The rollback determination unit 304 starts the operation with a notification from the rollback registration unit 306 as a starting point (S800). Further, the rollback determination unit 304 may be periodically activated without the notification from the rollback registration unit 306. In the case of arbitrary activation, the rollback determination unit 304 may be activated, for example, via a button of a web browser or the like.

The rollback determination unit 304 acquires rollback device information from the update device information storage unit 312 (S802).

The rollback determination unit 304 determines necessity of a rollback instruction to the low-end device 10 based on the rollback device information (S804). The rollback determination unit 304 may make a determination, for example, by comparing the number of rolled back low-end devices 10 with a predetermined value. For example, when there are three low-end devices 10 as in a configuration illustrated in FIG. 9, two low-end devices may be used as a threshold. That is, when two out of three low-end devices 10 are described in the rollback device information, the rollback determination unit 304 may determine that the rollback instruction is necessary.

The number of low-end devices 10 may be three or more or less. The predetermined value used as the threshold may be two or more or less, or may be expressed as a percentage. Furthermore, the threshold may be a dynamic value that changes according to conditions and the like.

Information other than the number of rolled back devices may be used to determine the necessity of the rollback instruction. The rollback determination unit 304 may determine necessity of rollback by using, for example, a model learned by a machine learning algorithm such as deep learning, a decision tree, or a support vector machine using information described in the rollback device information.

If it is determined that the rollback is not necessary (S804: NO), the processing may end.

If it is determined that rollback is necessary (S804: YES), the rollback determination unit 304 deletes and updates the rollback device information acquired from the update device information storage unit 312 (S806). The rollback determination unit 304 may update the rollback device information while old rollback device information is left in the update device information storage unit 312 by adding the version information or the like without deleting the rollback device information, or may store the rollback device information in an external storage medium as another example.

The rollback determination unit 304 updates the distribution software (S808). The rollback determination unit 304 acquires the software from the distribution software storage unit 310 based on, for example, the software version acquired from the rollback device information, and acquires the latest version of the software registered in the distribution software storage unit 310. The rollback determination unit 304 updates, for example, the latest version acquired from the distribution software storage unit 310 to a larger latest version, and associates the software acquired from the distribution software storage unit 310 with the latest version and stores the software in the distribution software storage unit 310.

The rollback determination unit 304 generates the software verification information for the software acquired from the distribution software storage unit 310, and stores the generated software verification information in the verification information storage unit 308 (S810).

The rollback determination unit 304 requests the software distribution unit 302 to update the software (S812). The rollback determination unit 304 may record a determination that the rollback is necessary in a file. Further, the rollback determination unit 304 may transmit the determination that rollback is necessary to the outside via the protocol such as HTTP, HTTPS, or SMTP, or may display the determination on the external device such as the display. Furthermore, the external device or a person who has received a transmission result may request the software distribution unit 302 to update the software via various interfaces.

Processing of S806 may be performed in a changed order during or after processing of S808 to S812. Further, the processing of S810 may be performed before the processing of S808, or may be performed after the processing of S812.

As described above, according to the present embodiment, by providing the software management console 30, when the rollback occurs in the plurality of low-end devices, the rollback can be applied to the low-end devices before the abnormality occurs. In addition, it is possible to perform the rollback in cooperation with an update system that requests update to the latest software.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An information processing system comprising:
   one or more edge servers each having a storage and a processing circuit;
   one or more low-end devices each having a storage and a processing circuit, connected to at least one of the edge servers, and changing software in response to a request from the edge server; and
   a software management console having a storage and a processing circuit and connected to the edge server, wherein
      the processing circuit of the low-end device
         transmits abnormality information for detecting its own abnormality to the edge server, the storage of the edge server
         stores information on the software for every version and
         low-end device information including the version of the software to run on the low-end device, and the processing circuit of the edge server
         detects an abnormality in the low-end device based on the abnormality information acquired from the low-end device, acquires version information of the software of the low-end device stored in the storage based on the abnormality detected,
         acquires information on rollback software, which is a version of software older than a version in the version information of the software running in the low-end device, from the storage, and
         requests the low-end device to roll back the software based on the information on the rollback software, and
      wherein
         when rollback of the low-end device is requested, the processing circuit of the edge server transmits, to the software management console, rollback device information including information on the low-end device that has been rolled back, and the processing circuit of the software management console stores the rollback device information received, in the storage of the software management console.

2. The information processing system according to claim 1, wherein when the processing circuit of the edge server requests to update the software of the low-end device to update software, the processing circuit of the edge server stores a version of the update software, software information of the update software, and the low-end device information based on the update software in the storage of the edge server.

3. The information processing system according to claim 2, wherein
   the storage of the software management console stores distribution software for each version, and
   the processing circuit of the software management console
      distributes the distribution software to the edge server, and
      determines necessity of rollback for the low-end device based on the rollback device information acquired from the storage of the software management console.

4. The information processing system according to claim 3, wherein
   the processing circuit of the software management console further
      stores the distribution software as the update software in the storage of the software management console, for the low-end device determined to require rollback.

5. The information processing system according to claim 4, wherein
   the processing circuit of the software management console further
      determines the necessity of rollback when the number of low-end devices rolled back exceeds a predetermined value.

6. The information processing system according to claim 4, wherein
   the processing circuit of the edge server
      verifies the update software based on software verification information having information for verifying software including software signature information for the update software in response to a software update request to the low-end device from the software management console, the storage of the software management console
      stores the software verification information, the processing circuit of the software management console transmits the software verification information to the edge server, and
      when the processing circuit of the software management console determines that the rollback is necessary, the processing circuit of the software management console stores the software verification information of the rollback software in the storage of the software management console.

7. The information processing system according to claim 6, wherein
   the processing circuit of the edge server
      makes a duplicate rollback determination to skip updating the software in response to the software update request to the low-end device from the software management console when the same software as the software update request is already running in the low-end device.

8. The information processing system according to claim 1, wherein
   the information on the software includes memory information for arranging software, and
   the processing circuit of the low-end device
      maps the software to a memory based on the memory information.

9. The information processing system according to claim 1, wherein
the information on the software includes software signature information, and
the processing circuit of the low-end device
verifies the information on the software based on the software signature information.

10. The information processing system according to claim 1, wherein
the information on the software includes software format information, and
the processing circuit of the low-end device
converts the information on the software into software executable on the low-end device based on the software format information.

11. The information processing system according to claim 10, wherein
the software format information is information on encryption, encoding, or compression.

12. The information processing system according to claim 1, wherein
the processing circuit of the low-end device notifies the edge server of occurrence of the abnormality when an abnormal state occurs.

13. The information processing system according to claim 12, wherein
the processing circuit of the low-end device transmits memory data read from the memory of the low-end device at a timing of notification of the occurrence of the abnormality.

14. The information processing system according to claim 1, wherein
the abnormality information is a TCP/IP protocol message,
the storage of the edge server
stores an abnormality detection setting file in which TCP/IP header information, TCP/IP payload information, and a timeout time are described, and the processing circuit of the edge server
detects the abnormality when the header information and the payload information of the abnormality information are different from the abnormality detection setting file, or when a cycle of receiving the abnormality information is different from a cycle described in the abnormality detection setting file.

15. The information processing system according to claim 1, wherein
the processing circuit of the edge server stores a cause of occurrence of the abnormality as a log in the storage of the edge server.

16. An information processing device comprising:
a storage that stores information of software for every version to run in a low-end device connected and low-end device information including the version of the software to run on the low-end device; and
a processing circuit connected to the storage, wherein
the processing circuit
acquires abnormality information from the low-end device,
detects an abnormality in the low-end device based on the abnormality information acquired from the low-end device, acquires version information of the software of the low-end device stored in the storage based on the abnormality detected, acquires information on rollback software, which is a version of software older than a version in the version information of the software running in the low-end device, from the storage,
requests the low-end device to roll back the software based on the information on the rollback software, and
transmits, when requesting rollback of the low-end device, rollback device information including information on the low-end device that has been rolled back to a software management console to store the rollback device information in a storage of the software management console.

17. A non-transitory computer readable medium storing a program executed by an information processing device to perform an information processing method, the information processing device comprising:
a storage that stores information of software for every version to run in a low-end device connected and low-end device information including the version of the software to run on the low-end device; and
a processing circuit, connected to the storage, performing the method, wherein the method comprises:
acquiring abnormality information from the low-end device;
detecting an abnormality in the low-end device based on the abnormality information acquired from the low-end device;
acquiring version information of the software of the low-end device stored in the storage based on the abnormality detected, and acquiring information on rollback software, which is a version of software older than a version in the version information of the software running in the low-end device, from the storage;
requesting the low-end device to roll back the software based on the information on the rollback software; and
transmitting, when requesting rollback of the low-end device, rollback device information including information on the low-end device that has been rolled back to a software management console to store the rollback device information in a storage of the software management console.

* * * * *